United States Patent Office 3,660,402
Patented May 2, 1972

3,660,402
BENZAZOCINO QUINAZOLINES
Dietmar A. Habeck, Dover, and William J. Houlihan, Mountain Lakes, N.J., assignors to Sandoz-Wander, Inc., Hanover, N.J.
No Drawing. Filed Sept. 10, 1970, Ser. No. 71,280
Int. Cl. C07d 51/48
U.S. Cl. 260—251 A                          2 Claims

ABSTRACT OF THE DISCLOSURE

Benzazocino quinazolines, e.g. 5,6,7,8-tetrahydro-14H-[1]benzazocino[2,1-b]quinazolin-14-one, prepared from anthranilic acids or esters thereof and novel substituted benzazo compounds, are useful as sedative-hypnotics.

---

This invention relates to benzo-quinazolines, intermediates therefor, and process for their preparation. More particularly, the invention pertains to substituted and unsubstituted tetrahydro benzazocino[2,1-b]quinazolin-14-ones.

The benzazocino-quinazolines of this invention may be represented by the formula (I)

where each $R_1$, independently, represents hydrogen, loweralkyl, i.e. alkyl of 1-5 carbon atoms, e.g. methyl, ethyl, isopropyl and the like, trifluoromethyl, halo of atomic weight about 19-36, or nitro, $R_2$ represents loweralkyl, as earlier defined, halo of atomic weight about 19-36, or nitro, and $n$ represents 0, 1 or 2, provided that two nitro or trifluoromethyl groups, or a combination thereof, are not on adjacent carbon atoms. This proviso is and continues below to be part of the definition of the above-mentioned substituents.

The compounds of Formula I are prepared according to the following reaction scheme:

(II)      (III)

(I)

where $R_1$, $R_2$ and $n$ are as previously defined, $R_3$ represents hydrogen or loweralkyl, as previously defined, and $R_4$ represents halo of atomic weight 35–80, lower alkoxy, i.e. alkoxy having 1–5 carbon atoms, such as methoxy, ethoxy or propoxy, or $R_5$-sulfonyloxy, where $R_5$ represents lower alkyl, as earlier defined, or $$\left(R_6\right)_n \text{—phenyl}$$

where $R_6$ represents lower alkyl as earlier defined, or halo of atomic weight 19–36, and $n$ is an defined above.

The reaction is performed in inert organic solvent, but the particular solvent or solvents used is not critical and excesses of either reagent may be so used if desired. Aromatic hydrocarbons such as benzene and toluene, chlorinated hydrocarbons such as dichlorobenzene and the like and lower alkanols e.g., methanol, ethanol and isopropanol are exemplary of the types of solvents which may be used. The reaction may be performed at 50°–200° C., conveniently the reflux temperature of the system, but the particular temperature used is not critical. If desired, the reaction may be performed under inert gas, such as nitrogen gas; this is not considered necessary but is merely desirable for improved yields. Additionally, a Lewis acid catalyst such as $BF_3$·etherate may be used but it also is not essential in providing the compounds (I).

Certain of the compounds of Formula III, particularly those wherein $R_4$ represents halo of atomic weight 35–80, and lower alkoxy (compounds IIIa), may be prepared from the compounds of the formula (IV)

where $R_2$ and $n$ are as previously defined.

Compounds (IIIa) where $R_4$ is lower alkoxy are preparable from the compounds of Formula IV by treating the latter with a trialkoxy tetrafluoroborate, such as trimethoxy tetrafluoroborate or triethoxy tetrafluoroborate, in inert organic solvent such as halogenated hydrocarbons, e.g. chloroform or methylene dichloride at 30–150° C., conveniently the reflux temperature of the system. To obtain compounds (IIIa) where $R_4$ represents said halo, treatment of compounds (IV) may be carried out with halogenating agents such as metal halides or oxyhalides, e.g. $PCl_5$, $SOCl_2$ and the like, or phosgene and the like, in halogenated hydrocarbons such as chloroform or methylenedichloride, or aromatic hydrocarbons such as benezne or toluene or xylene, and the like, at about 0° C. to the reflux temperature of the system, preferably 10–80° C. Neither the temperatures nor the particular solvents used are critical.

The compounds of Formula IIIa where $R_4$ represents lower alkoxy may also be obtained from the corresponding compound (IIIa) where $R_4$ is halo by dissolving the latter in an appropriate lower alkanol solvent, e.g. ethanol, and treating said compound (IIIa) with an alkali metal alkoxide corresponding to the alkoxy group desired, and heating to about 40–80° C., conveniently the reflux temperature of the system. The particular temperature of the reactions is not critical.

Certain of the compounds of Formula III, particularly those where $R_4$ is $R_5$-sulfonyloxy (compounds IIIb) are prepared from compounds of the formula (V)

(where $R_2$ and $n$ are as previously defined) by treating the latter in inert solvent such as halogenated hydrocarbons, e.g., dichloroethane at a temperature of from about minus 60° to 50° C., preferably minus 20° to 25° C., for about 0.5–10 hours with $R_5$-sulfonyl halide, i.e. a halide wherein the halo moiety has an atomic weight of about 35–80, where $R_5$ is as previously defined, in the presence of pyridine. The resulting compounds (III) are rather unstable and are preferably reacted directly with the compounds (II) so as to obtain the compounds (I) in improved yields. The particular solvents and temperatures used are not critical.

Certain of the compounds of Formulae II, IV and V are known and may be prepared according to methods disclosed in the literature. Those compounds of Formulae II, IV and V not specifically disclosed may be prepared using analogous methods from known materials.

The compounds of Formula I are useful because they possess pharmacological activity in animals. In particular, they have central nervous system (CNS) activity and may be used as sedative-hypnotics as indicated by the activity in cat given about 30 mg./kg. of active agent and tested in the following manner: Chronically implanted electrodes are used to study the effects of drugs on sleep in male cats. Monopolar cortical leads on the sensory motor and occipital cortices and an electro-oculogram are recorded via stainless steel screws. Bipolar concentric subcortical leads include the amygdala, hippocampus, septum, medium forebrain bundle, hypothalmus, olfactory bulb, anterior and posterior reticular formation and the lateral geniculate nucleus of the thalamus are among the sites used for implatations (the exposed tip of the electrode extends 0.5–0.75 mm. beyond the barrel). Brain readings are obtained via ten or sixteen channel electroencephalographs.

For the recording sessions, the cats are placed in full side observations cages at the same time every day for either four or eight hours. After four hours (during the eight hour studies) the cats are allowed free access to food and water for thirty minutes.

Outside noise is masked by background white noise. Gross behavior is monitored via closed circuit television and video tape recordings.

Control data are collected at least two days per week and accumulated to give control data for ten to twenty sessions per cat.

Active compound is administered I.P. with at least six days intervening between the compound injections. Active compound is injected either stat, fifteen or thirty minutes prior to placing the animals in the observation cages. Physiological saline is administered via similar routes and pre-injection times (as above) on all control runs. Data from each session are statistically compared (via computer analysis) to the previous 10–20 control sessions for that particular animal, with particular emphasis given to the following phases of the sleep-wakefulness cycle: resting awake, light sleep, deep sleep, paradoxical (REM) sleep, "pseudo-"paradoxical sleep, latency to onset of deep sleep, and latency to onset of first epoch of paradoxical sleep.

For this use the compounds of Formula I may be combined with one or more pharmaceutically acceptable carriers or adjuvants. They may be administered orally or parentally and depending upon the compound employed and the mode of administration the exact dosage may vary.

In general, satisfactory results are obtained when the active agent is administered at a daily dosage of about 2 mg. to about 100 mg. orally per kg. of animal body weight. This daily dosage is preferably administered 2 to 4 times a day, or in sustained release form. For most large mammals such as primates, the total daily dosage is from about 150 mg. to about 1500 mg. Dosage forms suitable for internal use comprise from about 38 mg. to about 750 mg. of the active compound in intimate admixture with a solid or liquid pharmaceutically acceptable carrier or diluent. A representative formulation suitable for oral administration is a capsule prepared by conventional techniques which contains 100 gms. of 5,6,7,8-tetrahydro - 14H - [1]benzazoeino[2,1-b]quinazolin-14-one and 200 gms. of inert filler (e.g. starch, lactose, or the like).

EXAMPLE 1

5,6,7,8-tetrahydro-14H[1]benzazocino[2,1-b]quinazolin-14-one

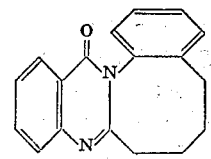

A mixture of 8.5 g. of 2-ethoxy 3,4,5,6-tetrahydro-1-benzazocine, 7.5 g. of anthranilic acid and 1 drop of borotrifluoride etherate is refluxed in 100 ml. of ethanol for 12 hours under nitrogen. The solvent is stripped off, the residue taken up in benzene and the resulting solution washed with aqueous sodium bicarbonate (2 N). The benzene is stripped off and the residue is distilled to remove material to provide 5,6,7,8-tetrahydro-14H[1]benzazocino[2,1-b]quinazolin-14-one; M.P. 158° C.

When the above procedure is carried out and 2-chloro-8-methyl-3,4,5,6-tetrahydro-1-benzacocine,
2-mesyloxy-7-chloro-3,4,5,6-tetrahydro-1-benzazocine,
7,9-dichloro-2-tosyloxy-3,4,5,6-tetrahydro-1-benzazocine or
2-methoxy-8-nitro-3,4,5,6-tetrahydro-1-benzazocine is used in place of 2-ethoxy-3,4,5,6-tetrahydro-1-benzazocine, there is obtained 3-methyl-5,6,7,8-tetrahydro-14H[1]benzazocino[2,1-b]quinazolin-14-one,
4-chloro-5,6,7,8-tetrahydro-14H[1]benzazocino[2,1-b]quinazolin-14-one,
2,4-dichloro-5,6,7,8-tetrahydro-14H[1]benzazocino-[2,1-b]quinazolin-14-one, or
3-nitro-5,6,7,8-tetrahydro-14H[1]benzazocino[2,1-b]quinazolin-14-one, respectively.

When the above procedure is carried out and 6-amino-4-methyl-benzoic acid,
6-amino-trifluoromethyl benzoic acid,
6-amino-3,4-dichloro benzoic acid,
6-amino-3-nitro benzoic acid, or
6-amino-4-chloro benzoic acid methyl ester is used in place of anthranilic acid, there is obtained 11-methyl-5,6,7,8-tetrahydro-14H[1]benzazocino[2,1-b]quinazolin-14-ones,
11-trifluoromethyl-5,6,7,8-tetrahydro-14H[1]benzazocino[2,1-b]quinazone-14-one,
11,12-dichloro-5,5,7,8-tetrahydro-14H[1]benzazocino-[2,1-b]quinazolin-14-one,
12-nitro-5,6,7,8-tetrahydro-14H[1]benzazocino[2,1-b]quinazolin-14-one, or
11-chloro-5,6,7,8-tetrahydro-14H[1]benzazocino[2,1-b]quinazolin-14-one, respectively.

EXAMPLE 2

2-chloro-3,4,5,6-tetrahydro-1-benzazocine

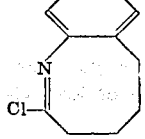

To 100 ml. of chloroform is added 15 g. of 3,4,5,6-tetrahydro-1-benzazocin-2-(1H)one. Phosgene is introduced into the solution to saturation. The resulting solution is allowed to stand at room temperature for 12 hours, the solvent is stripped off, and the resulting oil is taken up in benzene and refluxed for 20 minutes. The benzene is then stripped off to provide 2-chloro-3,4,5,6-tetrahydro-1-benzazocine as an oil.

When the above process is carried out and 8-methyl-3,4,5,6-tetrahydro-1-benzazocin-2-(1H)one is used in place of 3,4,5,6-tetrahydro-1-benzazocin-2-(1H)one, there is obtained, 2- chloro - 8 - methyl-3,4,5,6-tetrahydro-1-benzazocine.

EXAMPLE 3

2-ethoxy-3,4,5,6-tetrahydro-1-benzazocine

To 100 ml. of a 1:1 mixture of dichloromethane/chloroform is added 15 g. of 3,4,5,6-tetrahydro-1-benzazocin-2(1H)one. A 100% excess of triethyl oxonium tetrafluoroborate in dichloromethane is added to the resulting solution over a one hour period at a temperature of about 10–15° C. After addition is complete, the mixture is refluxed for 5 hours, washed with aqueous sodium carbonate (0.2 N) and dried. Evaporation of the solvent provides 2-ethoxy-3,4,5,6-tetrahydro-1-benzazocine.

When the above procedure is carried out using trimethyloxonium tetrafluoroborate in place of triethyloxonium tetrafluoroborate and 8 - nitro - 3,4,5,6-tetrahydro-1-benzazocin-2(1H)one, there is obtained, 2-methoxy-8-nitro-3,4,5,6-tetrahydro-1-benzazocine.

EXAMPLE 4

7-chloro-2-mesyloxy-3,4,5,6-tetrahydro-1-benzazocine

To a solution of 2.1 g. of 1-chloro-6,7,8,9-tetrahydro-5H-benzocyclohepten-5-one oxime in 50 ml. of 1,2-dichloroethane is added 2 ml. of pyridine. The solution is cooled to −10° C. and under nitrogen gas there is added a solution of 1.5 g. of methanesulfonyl chloride in 10 ml. of 1,2-dichloroethane. The addition is made dropwise over a period of one hour at about −10° C. The resulting solution is agitated for one hour at −10° to 0° C. and an additional two hours at room temperature to obtain 7-chloro-2-mesyloxy-3,4,5,6-tetrahydro-1-benzazocine. The nitrogen gas was added merely to improve yields.

When the above process is carried out and benzenesulfonyl chloride or 3,4-dichlorobenzenesulfonyl chloride is used in place of methanesulfonyl chloride, there is obtained 7 - chloro-2-benzenesulfonyloxy-3,4,5,6-tetrahydro-1-benzazonine, or 7 - chloro - 2-(3,4-dichlorobenzenesulfonyl-oxy)-3,4,5,6-tetrahydro-1-benzazonine, respectively.

When the above process is carried out and 1,3-dichloro-6,7,8,9 - tetrahydro - 5H-benzocyclohepten-5-one oxime is used in place of 1-chloro-6,7,8,9-tetrahydro-5H-benzocylohepten-5H-one oxime and p-toluenesulfonyl chloride is used in place of methanesulfonyl chloride, there is obtained 7,9 - dichloro-2-tosyloxy-3,4,5,6-tetrahydro-1-benzazocine.

What is claimed is:
1. A compound of the formula

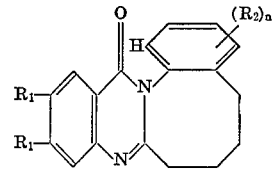

where each $R_1$, independently, represents hydrogen, loweralkyl, trifluoromethyl, halo of atomic weight 19–36, or nitro, $R_2$ represents loweralkyl, halo of atomic weight 19–36, or nitro, and $n$ represents 0, 1 or 2, provided that two nitro or trifluoromethyl groups, or a combination thereof, are not on adjacent carbon atoms.

2. A compound according to claim 1 which is 5,6,7,8-tetrahydro - 14H[1]benzazocino[2,1-b]quinazolin-14-one.

References Cited

UNITED STATES PATENTS 2,992,221   7/1961   Petersen et al. _____ 260—251
3,280,117   10/1966  Griot _____ 260—243

ALEX MAZEL, Primary Examiner

R. V. RUSH, Assistant Examiner

U.S. Cl. X.R.

260—239 BB, 239.3 B, 566 A; 424—251